United States Patent [19]
Wells et al.

[11] Patent Number: 5,870,683
[45] Date of Patent: Feb. 9, 1999

[54] MOBILE STATION HAVING METHOD AND APPARATUS FOR DISPLAYING USER-SELECTABLE ANIMATION SEQUENCE

[75] Inventors: Susan T. Wells; Juha Sippola; Pertti Kangas; Jaakko Vanttila, all of Oulu, Finland

[73] Assignee: Nokia Mobile Phones Limited, Salo, Finland

[21] Appl. No.: 718,097

[22] Filed: Sep. 18, 1996

[51] Int. Cl.$^6$ .................................................. H04Q 7/32
[52] U.S. Cl. .......................................... 455/566; 455/575
[58] Field of Search .................................. 455/556, 566, 455/575, 412; 348/552

[56] References Cited

U.S. PATENT DOCUMENTS

5,218,629  6/1993  Dumond, Jr. et al. ................... 455/412
5,485,504  1/1996  Ohnsorge ................................. 455/566
5,584,070  12/1996  Harris et al. ............................ 455/346

Primary Examiner—Andrew M. Dollnar
Attorney, Agent, or Firm—Perman & Green, LLP

[57] ABSTRACT

A wireless mobile station (10), such as a cellular telephone, executes a method to selectively display one of a plurality of graphical information sequences on a display (20) of the mobile station. The graphical information sequence is displayed during an Idle state of the mobile station, that is, when the mobile station is not involved in receiving a call or during a call. By example, the graphical information sequence can be displayed when the mobile station is in a Keyguard state, and/or in a Charging state, or when the mobile station is first powered on. In a further aspect of this invention the user interface (20, 22) of the mobile station is adapted to enable the user to selectively: enable or disable the display of a graphical information sequence; and/or select a graphical information sequence to be displayed from a plurality of pre-stored graphical information sequences; and/or input a definition of a graphical information sequence from an external source for storage in the mobile station.

38 Claims, 5 Drawing Sheets

MOBILE STATION HAVING METHOD AND APPARATUS FOR DISPLAYING USER-SELECTABLE ANIMATION SEQUENCE

FIELD OF THE INVENTION

This invention relates generally to radiotelephones and, in particular, to radiotelephone terminals or mobile stations such as those capable of operation with a cellular network.

BACKGROUND OF THE INVENTION

It is known in the art to provide a mobile station (e.g., a cellular telephone) with a display (typically a low power LCD display) for displaying alphanumeric information to a user. The alphanumeric information is useful in operating the mobile station, and can represent, by example, telephone numbers, various menu functions, or the current state of the mobile station (e.g., keyboard locked (e.g., Keyguard active), home/roaming, etc.).

Figure 5:
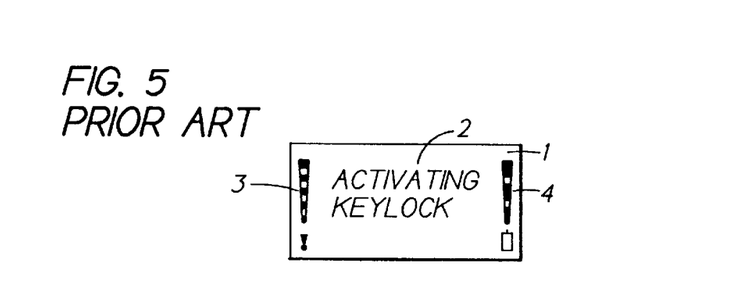
FIG. 5 illustrates a prior art display screen of a mobile station, and shows an alphanumeric text region and a plurality of predefined functional indicators.

It is also known in the art to provide a graphical (non-alphanumeric) functional indicator on the display to indicate a current operating condition of the mobile station. For example, and referring to FIG. 5, in some mobile stations manufactured by the assignee of this patent application a display 1 includes a region for displaying alphanumeric information 2, and further includes a first predefined functional indicator 3 for showing the received signal strength, and a second predefined functional indicator 4 for showing the charge state of the battery. In each of the functional indicators 3 and 4 a plurality of vertically disposed segments are provided as a part of the display 1 itself. As the signal strength fluctuates more or less of the segments of the indicator 3 are illuminated in a bottom to top fashion (all segments being illuminated indicates maximum received signal strength). For the indicator 4, when the battery is fully charged all of the segments are illuminated. As the battery discharges the segments are extinguished in turn, starting from the top. When connected to a battery charger, the alphanumeric display 2 may show "Charging", and the segments of the indicator 4 are rapidly illuminated from bottom to top in a repetitive fashion.

The inventors are also aware of at least one mobile station that displays two different images of a telephone handset, and several associated surrounding curved line elements that represent a ringing "sound". This particular mobile station appears to be programmed to always toggle between these two images when an incoming call is received, i.e., when the mobile station is in the Alerting state.

OBJECTS OF THE INVENTION

It is a first object of this invention to provide a method for selectively displaying a graphical information sequence with a display of a mobile station, such as a cellular telephone.

It is a second object of this invention to provide a method for displaying one of a plurality of user-selectable graphical information sequences with a display of a mobile station, such as a cellular telephone.

It is a third object of this invention to provide a method for displaying a user-generated graphical information sequence with a display of a mobile station, such as a cellular telephone.

It is a fourth object of this invention to provide a method for displaying one of a plurality of user-selectable graphical information sequences with a display of a mobile station, such as a cellular telephone, when the mobile station is in an Idle state.

It is a further object of this invention to provide a method for enabling a user to selectively enable and disable a display of one or more graphical information sequences with a display of a mobile station, such as a cellular telephone.

It is one further object of this invention to provide a method for selectively displaying an alphanumeric message to a user with a display of a mobile station in such a manner that the message scrolls across the display in a vertical or horizontal direction.

SUMMARY OF THE INVENTION

The foregoing and other objects of this invention are realized by methods and apparatus in accordance with embodiments of this invention. A method of this invention is disclosed for operating a wireless user terminal or mobile station to selectively display one of a plurality of graphical information sequences on a display of the mobile station. The graphical information sequence is displayed during an Idle state of the mobile station, that is, when the mobile station is not involved in receiving a call or during a call. By example, the graphical information sequence can be displayed when the mobile station is in a Keyguard state, and/or in a charging state, or when the mobile station is first powered on.

In a further aspect of this invention the user interface of the mobile station is adapted to enable the user to selectively: enable or disable the display of a graphical information sequence; and/or select a graphical information sequence to be displayed from a plurality of pre-stored graphical information sequences; and/or input a definition of a graphical information sequence from an external source for storage in the mobile station.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
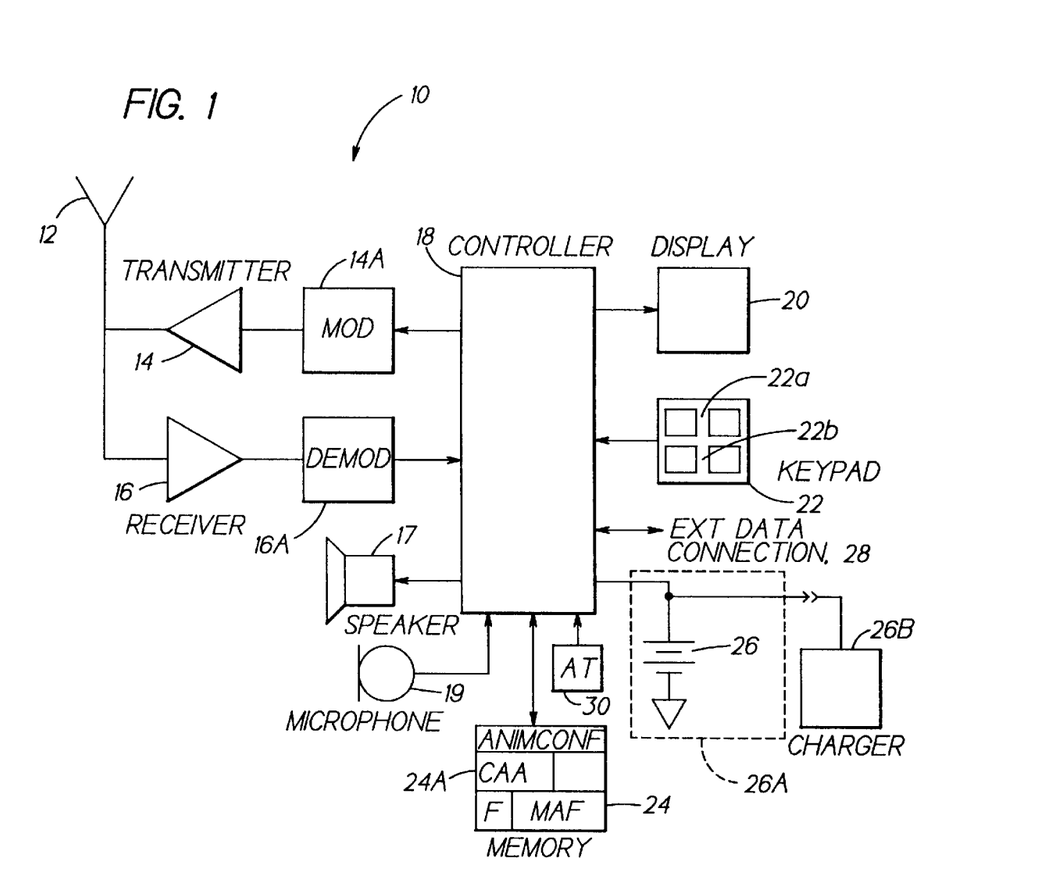
FIG. 1 is a block diagram of a mobile station that is constructed and operated in accordance with this invention.
Figure 2:
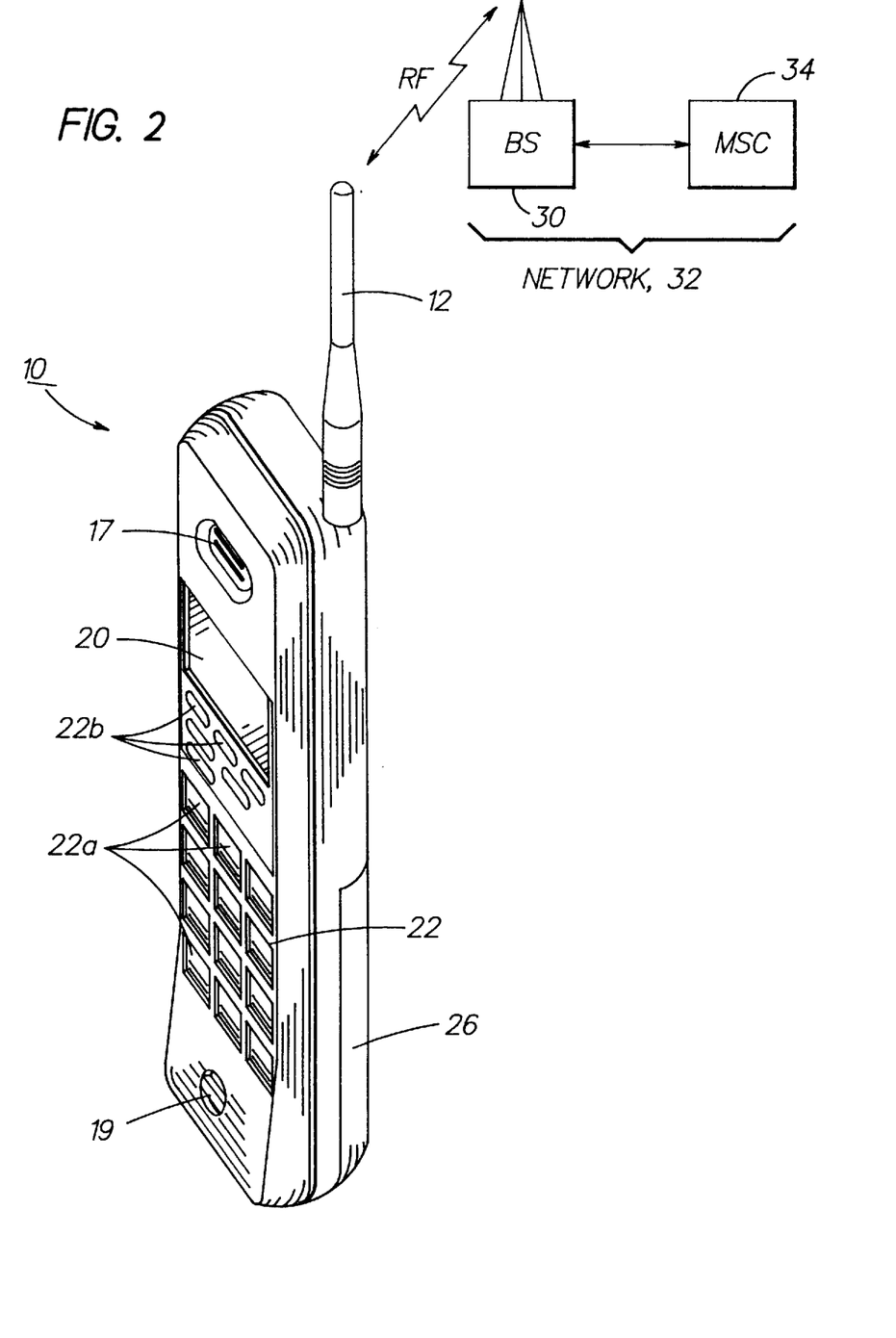
FIG. 2 is an elevational view of the mobile station shown in FIG. 1, and which further illustrates a cellular communication system to which the mobile station is bidirectionally coupled through wireless RF links.

Reference is made to FIGS. 1 and 2 for illustrating a wireless user terminal or mobile station 10, such as but not limited to a cellular radiotelephone or a personal communicator, that is suitable for practicing this invention. The mobile station 10 includes an antenna 12 for transmitting signals to and for receiving signals from a base site or base station 30. The base station 30 is a part of a cellular network that may include a Base Station/Mobile Switching Center/Internetworking function (BMI) 32 that includes a mobile switching center (MSC) 34. The MSC 34 provides a connection to landline trunks when the mobile station 10 is involved in a call.

The mobile station includes a modulator (MOD) 14A, a transmitter 14, a receiver 16, a demodulator (DEMOD) 16A, and a controller 18 that provides signals to and receives signals from the transmitter 14 and receiver 16, respectively. These signals include signalling information in accordance with the air interface standard of the applicable cellular system, and also user speech and/or user generated data.

It is understood that the controller 18 also includes the circuitry required for implementing the audio and logic functions of the mobile station. By example, the controller 18 may be comprised of a digital signal processor device, a microprocessor device, and various analog to digital converters, digital to analog converters, and other support circuits. The control and signal processing functions of the mobile station are allocated between these devices according to their respective capabilities.

A user interface includes a conventional earphone or speaker 17, a conventional microphone 19, a display 20, and a user input device, typically a keypad 22, all of which are coupled to the controller 18. The keypad 22 includes the conventional numeric (0–9) and related keys (#,*) 22A, and other keys 22B used for operating the mobile station 10. These other keys 22B may include, by example, a SEND key, various menu scrolling and soft keys, and a PWR key. The mobile station 10 also includes a battery 26 for powering the various circuits that are required to operate the mobile station. The battery 26 is contained, typically, within a removable battery pack 26A, and includes a capability to be connected to an external power source, such as a battery charger 26B. It is assumed, for some embodiments of this invention, that the controller 18 is capable of detecting when the charger 26B is connected, either through a switch closure or by sensing an increase in voltage above what is normally output from the battery 26.

The mobile station 10 also includes various memories, shown collectively as the memory 24, wherein are stored a plurality of constants and variables that are used by the controller 18 during the operation of the mobile station. For example, the memory 24 stores the values of various cellular system parameters and the number assignment module (NAM). An operating program for controlling the operation of controller 18 is also stored in the memory 24 (typically in a ROM device). The memory 24 may also store data, including user messages, that is received from the BMI 32 prior to the display of the messages to the user.

The operating program in the memory 24 includes routines to present messages and message-related functions to the user on the display 20, typically as various menu items. The memory 24 also includes routines for implementing the methods described below in relation to FIGS. 3A, 3B, 4A–4C and 6. In accordance with an aspect of this invention the memory 24 also stores at least one Current Animation Array (CAA) 24A of a type described below. The Current Animation Array 24A contains data for defining and controlling the operation of a desired Graphical Information Sequence (GIS). As employed herein, the GIS, also referred to simply as an 'animation', is comprised of a plurality of discrete and logically related animation 'frames', 'scenes', or 'images' (and/or alphanumeric characters) which when displayed sequentially present an informational and/or promotional and/or entertainment message on the display 20 using a certain frame (refresh) rate. An animation may also include audible information presented through, by example, the speaker 17. Information describing a GIS may be prestored in the mobile station 10 during manufacture, may be subsequently loaded though an external data connection 28 by a dealer or network provider, and/or may be subsequently loaded by a user from a data processor.

When an application program of the mobile station 10 invokes or calls an animation, the configuration of the animation is stored into the Current Animation Array 24A. An animation control procedure (executed by the controller 18) is then used to start the animation by calling it with a START parameter. A pointer or handle to a started animation is returned to the calling application program. There can be two or more animations active simultaneously and, as such, a plurality of CAAs 24A. An active animation is refreshed on the display 20 in cooperation with an animation timer (AT) 30 having a constant or programmable timeout period (configurable for each embodiment), for example 0.2 secs. An active animation can also be refreshed at some rate that is a multiple of the AT 30 timeout. In this latter case the controller 18 checks all active animations (i.e., the CAAs 24A), on the occurrence of the AT 30 timeout, to determine whether they require refresh. This determination is based on each animation's refresh time requirement, an element of the application's CAA 24A. For example, if the AT 30 timeout is set at 0.2 second, an animation can be refreshed every 0.2 sec., 0.4 sec., 0.6 sec., 0.8 sec., etc. That is, the periodic refreshing of an active animation includes operating a mobile station timer (e.g., AT 30) to periodically time-out at a programmed time-out rate, where the programmed time-out rate is equal to N times the periodic refresh rate, where N is an integer equal to or greater than one.

If an animation is required to be refreshed, it is called using a REFRESH command. In general, when refreshed a current animation scene or frame is replaced by a next consecutive frame or scene (see, for example, FIGS. 4A–4C). When all frames have been cycled through and displayed, a frame pointer can be initialized back to the first frame in the sequence and the cycle repeated. It is also within the scope of the invention to instead decrement the pointer such that it points to the next to last frame, and then cycle through the frames in reverse order. For a case where alphanumeric characters are displayed as the animation sequence (see, for example FIGS. 3A–3C), the presently displayed characters can simply be erased and replaced with the same or different characters written to a new location. In this manner both horizontal and vertical scrolling can be accomplished.

An animation state (i.e., in which "frame" the animation currently resides) is set or initialized by the application program in progress animations.

The application program uses an animation STOP command to halt an active animation, with the previously passed animation handle as a parameter.

Figure 6:
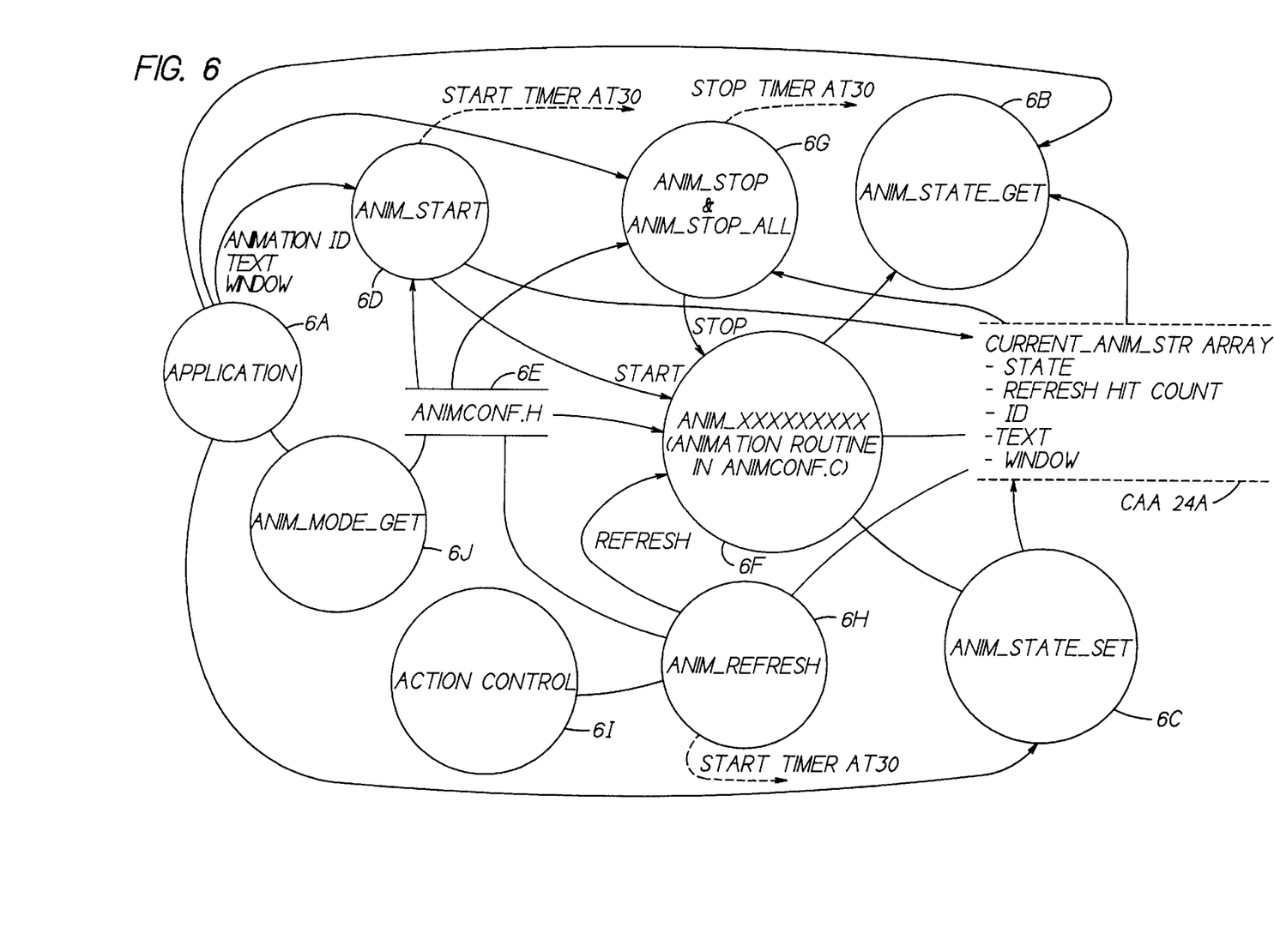
FIG. 6 is state diagram that illustrates the interaction between various animation data structures and functions in accordance with an aspect of this invention.

All configuration information is stored in an active application's CAA 24A. Reference can also be made to FIG. 6. In general, different animation procedures are implemented in animconf.c (6F), and different animation configurations are defined in animconf.h (6E). For example, and assuming a C language implementation, the CAA 24A can be defined as follows:

```
struct_current_animations_str [MAX_NBR_OF_ACTIVE_ANIMS]
{
    void *animation_parameter;
    WINDOW animation_window;
    uint8 animation_state;
    uint8 refresh_hit_count;
    uint8 animation_id;
};
```

The variables referred to above are defined as follows. The animation_state indicates the current state ('frame') of the animation. In so-called progress animations (i.e., animations that present a plurality of different frames or scenes in progression, as in FIGS. 4A–4C), the animation_state is set or read by an application 6A using anim_state_get/set functions 6B and 6C. A value of the zero indicates that the animation is initialized to a first frame, while a (maximum) value of 255 indicates that the last frame is displayed. That is, using this scheme a given progress animation may have up to 256 different frames or scenes, which are pointed to in sequence by the value of the animation-state variable.

In other (non-progress) animations the animation_state variable can be used internally by an animation, for example to indicate a number of dots to be displayed in a scrolling dots animation. The refresh_hit_count is used to enable different animation refresh times than the basic rate set by the AT 30 timeout period. When an animation is started (6D), this variable is set to zero, and every time the AT 30 times out this value is incremented. The animation is refreshed on the display 20 when the value of the refresh_hit_count variable is equal to a value defined in an animation configuration (animconf.h 6E) refresh rate field. The value of the refresh_hit_count variable is then reset to zero.

The animation_parameter is a parameter that can, at run-time, be passed to the animation. For example, text characters used in an animation can be passed to the animation in an animation_parameter.

The animation_id is the identification of the animation configuration (animconf.c 6F) to be used from animconf.h 6E. By example, if a user selects an animation from a list of animations designated by names (e.g., snowflakes, bouncing ball, etc.), it is the corresponding animation_id that is used to select the correct animation from the animconf.h 6E data structure.

The animation_window is a region or window on display 20 in which the animation is to be displayed. The window may comprises the entire useable portion of the display 20, or some subset of the entire useable portion. Different animations can be defined to be simultaneously active in different windows. The window can be defined by x-y coordinates for a graphical (point-addressable) display 20, or by row/column numbers for a character-based display.

With regard to the animation configuration (animconf.h) 6E, different animations are defined with the following parameters:

| | |
|---|---|
| animation_id | |
| animation_procedure: | a pointer to the animation procedure (in animconf.c) to be used |
| refresh rate: | the number of animation timer (AT 30) hits after which the animation is refreshed |
| parameter: | different meanings in different animations, for example, a number of scrolling dots or text characters |
| mode: | mode of the animation (bitfield): e.g., ANIMATION_WITH TEXT: Text is a part of the animation ANIMATION PING PONG: Animation frames are displayed in "ping-pong" mode (instead of an animation loop, e.g. loop: frame 1-2-3-4-1-2 . . . ping-pong: 1-2-3-4-3-2 . . . |

The following can be noted with regard to the animation interface functions or states shown in FIG. 6.

animation_start (6D)
Input: Animation ID
    Animation parameter
    Animation window
Returns: Handle to animation that was started
Description: Starts animation in the following way:
    Stores animation ID, parameter, window, state
    (initialized to 0) and refresh_hit_count
    (initialized to 0) to current animation array
    (CAA 24A) and calls the correct animation
    procedure (based on the ID) from animconf.c 6F
    with the ANIMATION_START parameter. This
    function also starts the animation timer (AT 30)
    and returns the animation's handle to point to
    the location where the animation information was
    stored in current animation array 24A.
animation_stop (6G)
Input: Animation handle (returned by animation start)
Returns: None
Description.:   Stops an active or started animation by
                stopping the AT 30 (for this animation),
                calls all active animation procedures with
                the ANIMATION_STOP parameter, and removes
                the stopped animation from the CAA 24A.
animation_stop_all (6G)
Input: None
Returns: None
Description:    When invoked, the animation_stop_all
                function stops all active animations by
                stopping the AT 30, calling all active
                animation procedures with the
                ANIMATION_STOP parameter, and initializes
                all active CAAs 24A.
animation_refresh (6H)
Input: None
Returns: None
Description:    This function refreshes all active
                animations by incrementing all active
                animations' refresh_hit_count in the CAA
                24A, by calling all active animation
                procedures that need to be refreshed with
                the ANIMATION_REFRESH parameter, and by
                (re)starting the AT 30. This function is
                invoked by an action control (6I), for
                example, a hardware or software interrupt
                generated by the AT 30.
animation_state_set (6C)
Input:     Animation handle (returned by animation_start
           6D)
           Animation_state
Returns: OK
         FAIL
Description:    This function sets the "state" of the
                specified animation. The meaning of the
                animation "state" is animation procedure
                dependent.
animation_state_get (6B)
Input:     Animation handle (returned by animation start
           6D)
Returns: Animation state
Description:    This function returns the state of the
                specified animation. As before, the meaning -continued

```
                of animation "state" is animation procedure
                dependent.
animation_mode_get (6J)
Input:      Animation ID
Returns:    Animation mode
Description: This function returns the mode of the
             specified animation. This function is
             useful in, by example, a note service, when
             checking whether to write the note's text
             or pass it to the animation. In general,
             the animation mode affects the appearance
             of an animation, and can be used to cause
             a given animation seguence to be displayed
             in different ways (e.g., to scroll in a
             specified direction).
```

Each animation procedure is defined (implemented) in animconf.c (6F). The "template" of an animation procedure is as follows:

```
void animation_<animation_name>  (uint8 action
                                  /*START/STOP/REFRESH*/
                                  uint8 index)
                                  /*Index of the
                                  animation in current_
                                  animation_str*/
{
switch (action)
    CASE ANIMATION_START:
    /* Actions performed when animation is started */
    break;
    CASE ANIMATION_REFRESH:
    /* Actions performed when animation is refreshed */
    break;
    CASE ANIMATION_STOP:
    /* Actions performed when animation is stopped */
    break;
}
```

Suitable, but not limiting, animation procedures include scrolling dots, a progression bar (e.g., a variable length bar pattern), a waiting bar, and a 'flip-book icon animation', wherein a plurality of different images of an icon can be sequentially displayed to give an appearance of movement, size change, rotation, etc.

In the embodiments described herein the animation can be displayed with both character-based and graphical (point-addressable) displays. The character display's animation is restricted to displaying text and other predefined characters to achieve movement. The graphical display's animation can be more flexible to achieve any desired type of image and movement (within the resolution of the display 20 (e.g., 70×41 pixels)).

An example of an animation in accordance with this invention is now described in reference to a Keyguard feature of the mobile phone 10. The user typically activates the Keyguard feature to prevent accidental operation of the powered-on mobile station 10. When the user desires to return the mobile station 10 to its normal functionality, the Keyguard feature is deactivated. When the Keyguard is active, no keypad tones are generated and no key-presses are accepted, except for emergency numbers and for deactivating the Keyguard feature.

When the Keyguard is activated manually, or automatically, a Keyguard fixed indicator icon, certain softkey indicators, and the unlock softkey text or unlock icon may be displayed on display 20. By example, the Keyguard icon may resemble a lock.

In accordance with this invention a Keyguard Animation is user selectable from a Keyguard settings menu option. In this case the user manipulates the keypad 22, while viewing the display 20. By example, the user first selects the Keyguard function, then selects an Animation menu item, then depresses an On softkey (to turn on or enable the animation function), and then confirms the selection by depressing an OK softkey. The user may select a specific animation sequence to be displayed by scrolling through a plurality of animation sequence choice items, and confirming his choice by depressing the OK softkey. A confirmation note 'Animation Turned ON' may then display on the display 20. The controller 18 stores information in the memory 24 for recording the user's choice of animation sequence, and to indicate that the animation feature is enabled.

The next time that the user activates the Keyguard feature, the selected animation is automatically invoked, started, and run by the controller 18, as described above with respect to FIG. 6. The selected Keyguard animation may be activated after a time delay period that is defined in the Keyguard menu activation. When the Keyguard animation is On (running), it displays when the Keyguard is active in place of the conventional 'soft' indicators and/or the Keyguard icon.

Figure 3A:
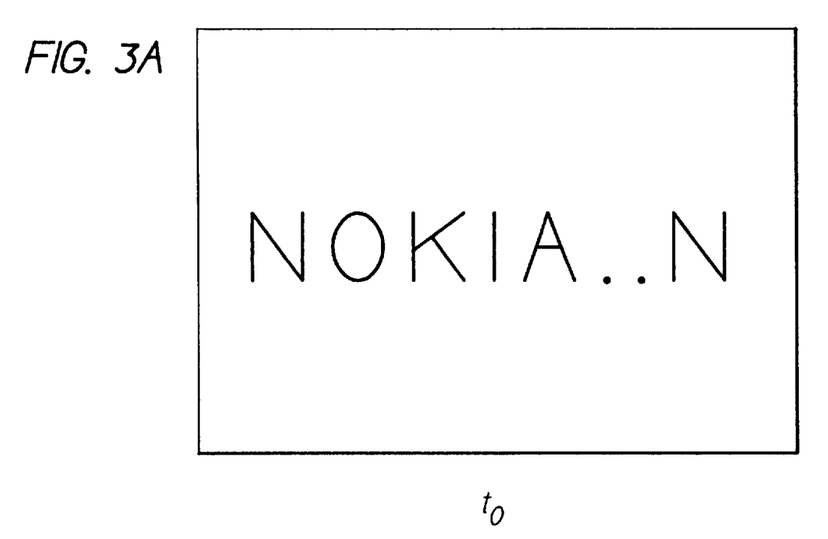
FIGS. 3A and 3B illustrate, at two different instants in time, the scrolling of an alphanumeric message across the display screen.
Figure 3B:
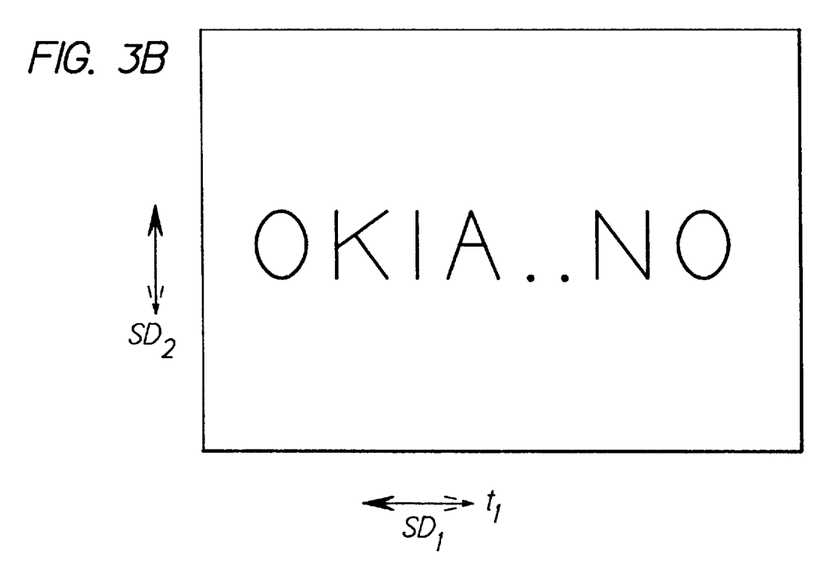

Examples of animations are shown in FIGS. 3A, 3B, and 4A–4C. FIGS. 3A and 3B show a Scroll Text Animation wherein a text string, such as the manufacturer's or the service provider's name, is scrolled across the display 20. FIG. 3A shows the text at time $t_o$, while FIG. 3B shows the text at time $t_1$. The text is scrolled in a Scroll Direction (SD) which is illustrated as being from right to left ($SD_1$). In other Scroll Text Animations the scroll direction could be from left to right, or from bottom to top or top to bottom ($SD_2$), or simultaneous horizontal and vertical scrolling can be accomplished. The text may also 'ping-pong' from side to side or from top to bottom. By example, the text may scroll from right to left until the first character reaches the left edge of the display, and then reverse direction and scroll to the right until the rightmost character reaches the right edge of the display, etc. The displayed text can be preprogrammed into the mobile station by the manufacturer, service provider, dealer, or can be entered by the user. The text is scrolled at the refresh rate defined for the Scroll Text Animation, as indicated by the associated aniconf.h 6E.

Figure 4A:
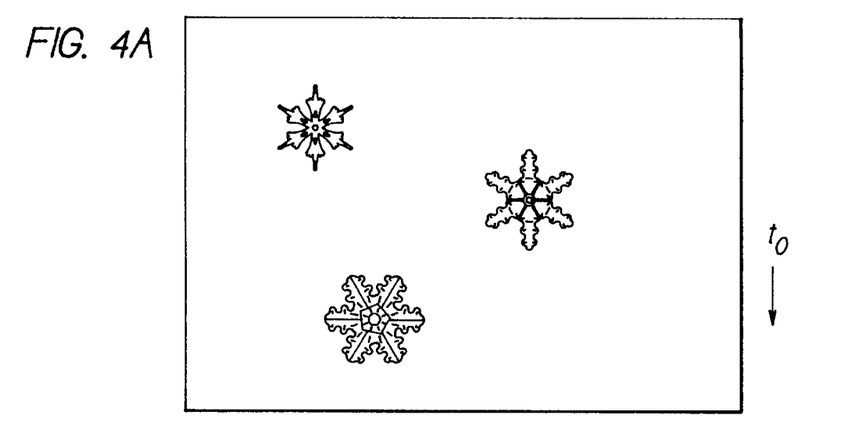
FIGS. 4A–4C illustrate, at three different instants in time, the evolution of a graphical information sequence on the display screen.
Figure 4B:
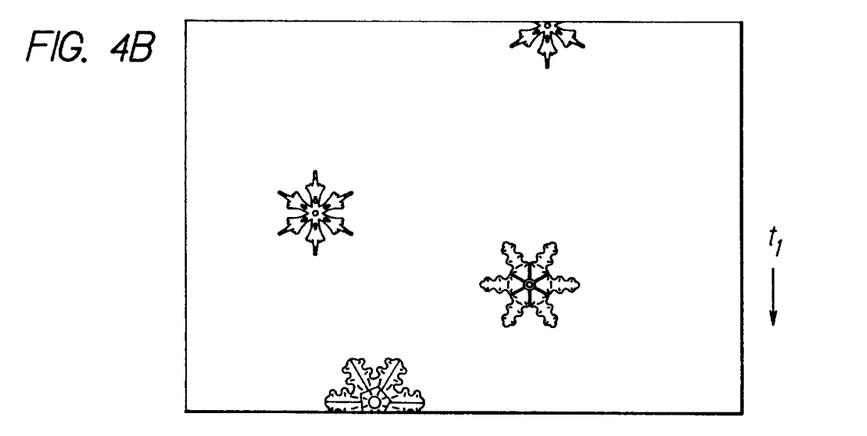
Figure 4C:
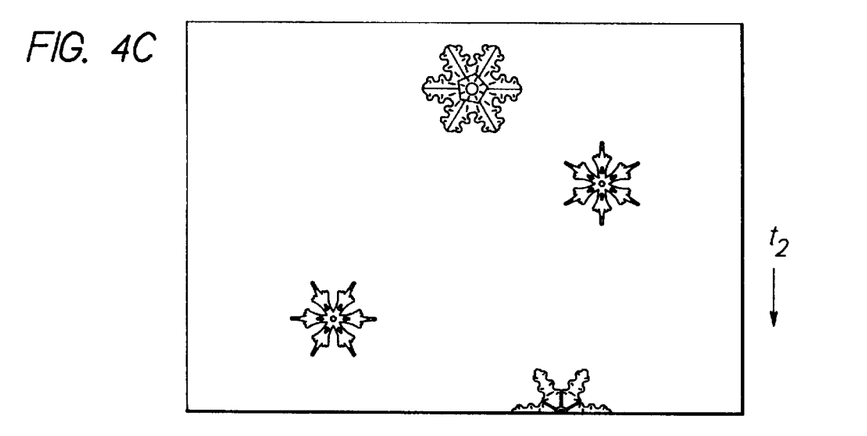

FIGS. 4A–4C illustrate the use of graphical images or patterns (e.g., snowflakes) for the animation sequence. In this animation sequence the snowflake images appear to "fall" from the top of the display 20 towards the bottom. As snowflakes disappear from view new snowflakes appear at the top of the display. The snowflakes "fall" at a rate established by the refresh rate defined for the Snowflakes Animation. This rate could be made variable as a function of some internal state of the mobile station 10. By example, the refresh rate could increase or decrease as a function of the charge state of the battery 26, or as a function of the received signal strength level.

It should be noted that each individual one of the snowflake images may be a separate animation sequence having an associated refresh rate and window that is different from that of the other snowflake images. That is, when the Snowflakes Animation is started, a plurality of individual Snowflake Animations are invoked and started. Alternatively, a single Snowflakes Animation, comprised of a sequence of the images as shown, can be invoked and started.

When the mobile station 10 is in the Idle mode (e.g., monitoring the Paging channel to determine if an incoming call has been received), the controller 18 and other circuitry are typically powered down to conserve power (sleep mode).

Periodically an interrupt is generated to 'wake up' the controller 18 and re-power the circuitry required to receive and demodulate the Paging channel. During these wake up periods the controller 18 performs any other necessary housekeeping functions before powering off the circuits and reentering the sleep mode. In accordance with an aspect of this invention, the controller 18 also performs any required animation processing when an animation is active. As such, it should be realized that the programming of the AT 30 may be related to the wake up intervals of the controller 18.

However, during battery charging the controller 18 may not be required to operate in the sleep mode, and the Keyguard animation may not therefore be limited to being refreshed only during the wake up periods of the controller 18.

In one embodiment of the Keyguard animation the selected animation displays when the Keyguard is activated (manually or automatically) and the mobile station 10 is connected to and drawing power from the charger 26B (but not necessarily charging). In this case the user is typically not interacting with the mobile station 10, so the animation can be displayed without interfering with any normal operations. Furthermore, running the selected animation only when connected to the charger 26B does not drain the battery 26 (talk and standby times are thus not affected), and also does not limit the basic animation refresh rate to the wake up periods of the controller 18. As such, the displayed animation can be more 'animated'. An active animation terminates when the Keyguard is deactivated (manually by the user or automatically by the mobile phone exiting the Idle mode), or if the mobile station 10 is disconnected from charger 26B.

In a further embodiment of this invention the animation can be displayed in the Alerting state, together with the normal ringing tone, and the caller number or name information can be displayed simultaneously with the animation or, for example, a short period of time after the Alerting state is entered but before activating the animation. Pressing the Send key to answer the call terminates the animation (see State 6G in FIG. 6). Further in accordance with this invention the Alerting animation can include a predetermined audio alerting indicator, such as a musical tone. By example, the Snowflakes Animation of FIGS. 4A–4C could be displayed during the Alerting state along with a seasonal (e.g., Christmas) tune. In this embodiment certain user selectable ringing tone(s) may also activate an associated animation.

It is further within the scope of this invention to employ the animations for automatic demonstration (auto-demo) purposes. By example, when the user or retail dealer first powers on the mobile station 10, as indicated by a flag (F) in the memory 24 that is initially cleared, a predetermined animation displays graphics for educational and/or promotional purposes. Other information, such as service provider or dealer's name information can be displayed with or as a part of the animation. The user can prevent the animation from displaying by pressing, for example, a displayed STOP softkey, or display the animation again by pressing a REPEAT softkey. To prevent the animation from displaying, or to erase, add, and possibly edit an animation, the user accesses an Auto-Demo menu option.

In accordance with this invention an animation is comprised of X number of discrete images displayed at intervals of Y ms (selectable or fixed values of, by example, X=3 to 10, Y=100 to 2000). With a display 20 capable of displaying only alphanumeric characters, in addition to all characters in the character set, a plurality of programmable characters can also be used. The programmable character shapes can be used to form icons, or can be designed to be displayed adjacent to one another to form a larger pattern or icon.

There may be a Master Animation Flag (MAF) stored in the memory 24 which is used to enable the Animation Mode only when set. In this manner only certain mobile stations 10 can be enabled to provide the animation function, or the animation function can be selectively activated by the dealer (or network operator through Over the Air Programming) as a value added feature.

A data structure defining a given animation sequence can be provided by the manufacturer, by third party vendors, by system operators, and/or by the user. Animations can be provided in the software of the mobile station 10 (the animation data can be stored in a read only memory (ROM) portion of the memory 24 in the factory), or can be loaded through the external data connection 28 using, by example, CellularWare™ or some equivalent programming tool, or can be loaded from the network 32 (FIG. 2) through the RF link by Over the Air Programming or by Short Message Service (SMS) messages (if supported by the network 32). An animation can also be 'flashed' into an electrically programmable ROM (EPROM) of the memory 24 by the dealer or service provider. If both ROM and EPROM data are used in one mobile station, it is preferred that the animation data stored in the EPROM takes preference, i.e., it is run if it is available.

Although this invention has been described in the context of preferred embodiments, it should be realized that a number of modifications to these teachings may occur to one skilled in the art. By example, although described above in the context of animation sequences that are preprogrammed, it is also within the scope of this invention to algorithmically generate patterns for display when the mobile station is in the Idle mode. By example, one or more different mathematical equations can be programmed into the mobile station 10, 'solved' by the controller 18 when the mobile station is in the Idle mode, and the results plotted along x and y axes of the display 20. For example, various quadratic equations can be used to provide different patterns, as can known types of equations to produce fractal patterns. In this case the refresh rate may be related to the number of points that are plotted per unit of time. The equations can be solved using variables generated randomly or pseudorandomly by the controller 18, or from variables entered by the user through a suitable menu option.

Also, it should be realized that the use of various selectable features (e.g., Keyguard) having animation capabilities are exemplary and not limiting.

Furthermore, it should be noted that the animations in accordance with this invention can be employed as a predetermined or user-selectable 'screensaver' when the mobile station is connected to a charger, such as a desktop charging station. In this case the animation may be a default animation, or may be selected by the connecting charging station, or by some other interconnected device, or manually by the user.

Thus, while the invention has been particularly shown and described with respect to preferred embodiments thereof, it will be understood by those skilled in the art that changes in form and details may be made therein without departing from the scope and spirit of the invention.

What is claimed is:

1. A method for operating a display of a wireless radiotelephone capable of bidirectional RF communications, comprising the steps of:

provding the radiotelephone with a user interface;

using the user interface to selectively enable or disable the display of an animation sequence;

using the user interface to select one of a plurality of animation sequences; and when the radiotelephone is in a predetermined mode of operation and the display of an animation sequence is enabled, displaying the selected one of the animation sequences on a display screen of the radiotelephone as individual ones of a plurality of logically-related images, wherein a timing of the display of individual ones of the plurality of logically-related images is variable and is a function, at any given time, of a magnitude of a parameter that is measured by the radiotelephone.

2. A method as set forth in claim 1, wherein the step of displaying includes a step of displaying the selected animation sequence at a predetermined location.

3. A method as set forth in claim 2, wherein the predetermined location is specified as a part of a data structure that defines the selected one of the animation sequences.

4. A method as set forth in claim 1, wherein the step of displaying includes a preliminary step of executing an animation start function, a step of periodically executing an animation refresh function, and a step of executing an animation stop function.

5. A method as set forth in claim 1, wherein the step of displaying includes a step of generating predetermined audio information.

6. A method as set forth in claim 1, and comprising an initial step of storing said plurality of animation sequences into a memory of the radiotelephone, and wherein the step of storing includes a step of inputting a data structure for defining each of said animation sequences through one of a data connection or an RF connection.

7. A method as set forth in claim 1, wherein the predetermined mode of operation is an automatic demonstration (auto-demo) mode of operation.

8. A method as set forth in claim 1, wherein the step of displaying includes a step of scrolling alphanumeric characters across the display.

9. A method as set forth in claim 1, wherein the step of displaying includes a step of displaying at least one graphical image on the display.

10. A method as set forth in claim 1, wherein the step of displaying includes a step of displaying a timed sequence of logically-related graphical images on the display.

11. A method as set forth in claim 1, wherein the parameter that is measured by the radiotelephone is a function of a charge state of a radiotelephone battery.

12. A method as set forth in claim 1, wherein the parameter that is measured by the radiotelephone is comprised of a presence of a battery charger coupled to a radiotelephone battery.

13. A method as set forth in claim 1, wherein the parameter that is measured by the radiotelephone is comprised of a value of a received RF signal strength.

14. A method for operating a display of a wireless mobile station capable of bidirectional RF communications, comprising the steps of:

providing the mobile station with a user interface;

using the user interface to selectively enable or disable the display of an animation sequence;

using the user interface to select one of a plurality of animation sequences; and when the mobile station is in a predetermined mode of operation and the display of an animation sequence is enabled, displaying the selected one of the animation sequences, wherein the step of displaying includes a preliminary step of executing an animation start function, a step of periodically executing an animation refresh function, and a step of executing an animation stop function, and wherein the step of executing the animation start function occurs after the mobile station enters an Idle mode of operation, and wherein the step of executing the animation stop function occurs automatically when the mobile station exits the Idle mode of operation.

15. A method as set forth in claim 14, wherein the step of displaying includes a step of refreshing the displayed animation sequence at a predetermined refresh rate.

16. A method as set forth in claim 15, wherein the predetermined refresh rate is specified as a part of a data structure that defines the selected one of the animation sequences.

17. A method as set forth in claim 14, wherein the step of displaying includes a step of refreshing the displayed animation sequence at a rate that is a function of an internal state of the mobile station.

18. A method as set forth in claim 14, wherein at least one animation sequence is algorithmically generated by a data processor within the mobile station using at least one of pre-stored variables or variables entered through the user interface.

19. A method for operating a display of a wireless mobile station capable of bidirectional RF communications, comprising the steps of:

providing the mobile station with a user interface;

using the user interface to selectively enable or disable the display of an animation sequence;

using the user interface to select one of a plurality of animation sequences; and when the mobile station is in a predetermined mode of operation and the display of an animation sequence is enabled, displaying the selected one of the animation sequences, wherein the step of displaying includes a preliminary step of executing an animation start function, a step of periodically executing an animation refresh function, and a step of executing an animation stop function, and wherein the step of executing the animation start function occurs after the mobile station enters a Keyguard active mode of operation, and wherein the step of executing the animation stop function occurs automatically when the mobile station exits the Keyguard active mode of operation.

20. A method for operating a display of a wireless mobile station capable of bidirectional RF communications, comprising the steps of:

providing the mobile station with a user interface;

using the user interface to selectively enable or disable the display of an animation sequence;

using the user interface to select one of a plurality of animation sequences; and when the mobile station is in a predetermined mode of operation and the display of an animation sequence is enabled, displaying the selected one of the animation sequences, wherein the predetermined mode of operation is a Keyguard active mode of operation.

21. A method as set forth in claim 20, wherein the Keyguard active mode of operation that is active when the mobile station is coupled to an external power source, wherein the step of displaying includes a preliminary step of executing an animation start function, a step of periodically executing an animation refresh function, and a step of executing an animation stop function, wherein the step of executing the animation start function occurs after the mobile station enters the Keyguard active mode of operation, and wherein the step of executing the animation stop function occurs automatically when the mobile station one of exits the Keyguard active mode of operation or is disconnected from the external power source.

22. A method for operating a display of a wireless mobile station capable of bidirectional RF communications, comprising the steps of:

providing the mobile station with a user interface;

using the user interface to selectively enable or disable the display of an animation sequence;

using the user interface to select one of a plurality of animation sequences; and when the mobile station is in a predetermined mode of operation and the display of an animation sequence is enabled, displaying the selected one of the animation sequences, wherein the step of displaying includes a step of refreshing the displayed animation sequence at a rate that is a function of a sleep mode period of a mobile station controller.

23. A method for operating a display of a wireless mobile station capable of bidirectional RF communications, comprising the steps of:

providing the mobile station with a user interface;

using the user interface to selectively enable or disable the display of an animation sequence;

using the user interface to select one of a plurality of animation sequences; and when the mobile station is in a predetermined mode of operation and the display of an animation sequence is enabled, displaying the selected one of the animation sequences, wherein the step of displaying includes a step of refreshing the displayed animation sequence at a rate that is a function of an internal state of the mobile station, and wherein the internal state is a state of charge of a battery of the mobile station.

24. A method for operating a display of a wireless mobile station capable of bidirectional RF communications, comprising the steps of:

providing the mobile station with a user interface;

using the user interface to selectively enable or disable the display of an animation sequence;

using the user interface to select one of a plurality of animation sequences; and when the mobile station is in a predetermined mode of operation and the display of an animation sequence is enabled, displaying the selected one of the animation sequences, wherein the step of displaying includes a step of refreshing the displayed animation sequence at a rate that is a function of an internal state of the mobile station, and wherein the internal state is a received signal strength level.

25. A wireless radiotelephone capable of bidirectional RF communications, comprising:

a user interface comprising a keypad and a display;

a memory for storing data, including animation data for specifying a plurality of animation sequences; and a controller coupled to said user interface and to said memory, said controller being responsive to said user interface to selectively enable or disable the display of an animation sequence and to select one of said plurality of animation sequences, said controller being further responsive to said radiotelephone being in a predetermined mode of operation, when the display of an animation sequence is enabled, for controlling the display of the selected one of the animation sequences in accordance with the stored animation data corresponding to the selected one of the animation sequences, the selected one of the animation sequences being displayed as a succession of individual ones of a plurality of logically-related images, wherein a timing of the display of individual ones of the plurality of logically-related images is variable and is a function, at any given time, of a magnitude of a parameter that is measured by the radiotelephone.

26. A radiotelephone as set forth in claim 25, wherein said controller is operable for executing an animation start function, for periodically executing an animation refresh function, and for executing an animation stop function.

27. A radiotelephone as set forth in claim 25, wherein the predetermined mode of operation is an automatic demonstration (auto-demo) mode of operation.

28. A wireless mobile station capable of bidirectional RF communications, comprising:

a user interface comprising a keypad and a display;

a memory for storing data, including animation data for specifying a plurality of animation sequences; and a controller coupled to said user interface and to said memory, said controller being responsive to said user interface to selectively enable or disable the display of an animation sequence and to select one of said plurality of animation sequences, said controller being further responsive to said mobile station being in a predetermined mode of operation, when the display of an animation sequence is enabled, for controlling the display of the selected one of the animation sequences in accordance with the stored animation data corresponding to the selected one of the animation sequences, wherein said controller is operable for executing an animation start function, for periodically executing an animation refresh function, and for executing an animation stop function, and wherein said controller executes the animation start function while the mobile station is in an Idle mode of operation, and executes the animation stop function when the mobile station exits the Idle mode of operation.

29. A mobile station as set forth in claim 28, wherein said controller is responsive to stored animation data for refreshing the displayed animation sequence at a predetermined refresh rate and for displaying the selected animation sequence at a predetermined location on said display.

30. A wireless mobile station capable of bidirectional RF communications, comprising:

a user interface comprising a keypad and a display;

a memory for storing data, including animation data for specifying a plurality of animation sequences; and a controller coupled to said user interface and to said memory, said controller being responsive to said user interface to selectively enable or disable the display of an animation sequence and to select one of said plurality of animation sequences, said controller being further responsive to said mobile station being in a predetermined mode of operation, when the display of an animation sequence is enabled, for controlling the display of the selected one of the animation sequences in accordance with the stored animation data corresponding to the selected one of the animation sequences, wherein said controller is operable for executing an animation start function, for periodically executing an animation refresh function, and for executing an animation stop function, and wherein said controller executes the animation start function while the mobile station is in an Alerting mode of operation, and executes the animation stop function when the mobile station exits the Alerting mode of operation.

31. A wireless mobile station capable of bidirectional RF communications, comprising:

a user interface comprising a keypad and a display;

a memory for storing data, including animation data for specifying a plurality of animation sequences; and a controller coupled to said user interface and to said memory, said controller being responsive to said user interface to selectively enable or disable the display of an animation sequence and to select one of said plurality of animation sequences, said controller being further responsive to said mobile station being in a predetermined mode of operation, when the display of an animation sequence is enabled, for controlling the display of the selected one of the animation sequences in accordance with the stored animation data corresponding to the selected one of the animation sequences, wherein the predetermined mode of operation is a Keyguard active mode of operation when the mobile station is coupled to an external power source, wherein the controller executes an animation start function after the mobile station enters the Keyguard active mode of operation, and executes an animation stop function automatically when the mobile station one of exits the Keyguard active mode of operation or is disconnected from the external power source.

32. A wireless mobile station capable of bidirectional RF communications, comprising:

a user interface comprising a keypad and a display;

a memory for storing data, including animation data for specifying a plurality of animation sequences; and a controller coupled to said user interface and to said memory, said controller being responsive to said user interface to selectively enable or disable the display of an animation sequence and to select one of said plurality of animation sequences, said controller being further responsive to said mobile station being in a predetermined mode of operation, when the display of an animation sequence is enabled, for controlling the display of the selected one of the animation sequences in accordance with the stored animation data corresponding to the selected one of the animation sequences, wherein said controller is operable for executing an animation start function, for periodically executing an animation refresh function, and for executing an animation stop function, and wherein the controller refreshes the displayed animation sequence at a rate that is a function of a sleep mode period of the controller.

33. A wireless mobile station capable of bidirectional RF communications, comprising:

a user interface comprising a keypad and a display;

a memory for storing data, including animation data for specifying a plurality of animation sequences; and a controller coupled to said user interface and to said memory, said controller being responsive to said user interface to selectively enable or disable the display of an animation sequence and to select one of said plurality of animation sequences, said controller being further responsive to said mobile station being in a predetermined mode of operation, when the display of an animation sequence is enabled, for controlling the display of the selected one of the animation sequences in accordance with the stored animation data corresponding to the selected one of the animation sequences, wherein said controller is operable for executing an animation start function, for periodically executing an animation refresh function, and for executing an animation stop function, and wherein the controller refreshes the displayed animation sequence at a rate that is a function of an internal state of the mobile station, wherein the internal state is a function of at least one of a state of charge of a mobile station battery or a state of a mobile station received signal strength indicator.

34. A method for operating a display of a wireless mobile station capable of bidirectional RF communications, comprising the steps of:

providing the mobile station with a user interface;

using the user interface to select a Keyguard feature;

using the user interface to selectively enable or disable the display of an animation sequence while the Keyguard feature is active;

using the user interface to select one of a plurality of animation sequences to be displayed while the Keyguard feature is active, and when the display of an animation sequence is enabled; and in response to the user activating the Keyguard feature, when the display of the animation sequence is enabled, displaying the selected one of the animation sequences.

35. A method as set forth in claim 34, wherein the mobile station is coupled to an external power source, and further comprising a step of automatically terminating the display of the selected one of the animation sequences upon the occurrence of one of the Keyguard sequence being manually or automatically terminated or the mobile station being uncoupled form the external power source.

36. A method for operating a display of a wireless mobile station capable of bidirectional RF communications, comprising the steps of:

coupling the mobile station to a charger for charging a battery of the mobile station;

sensing with the mobile station that the mobile station is drawing power from the charger; and while the mobile station is coupled to the charger and is sensing that the mobile station is drawing power from the charger, displaying one of a predetermined or user-determined animation sequence on a display of the mobile station.

37. A method for operating a display of a wireless radiotelephone capable of bidirectional RF communications, comprising the steps of:

providing the radiotelephone with a user interface having a keypad and a display screen;

using the user interface to selectively enable or disable the display of an animation; and when the radiotelephone is in a predetermined mode of operation and the display of an animation is enabled, displaying the animation at a specified location on the display screen, the step of displaying including a step of periodically refreshing the displayed animation at a specified refresh rate so as to give a visual appearance of movement, wherein the specified location and the specified refresh rate form a part of an animation data structure stored within the radiotelephone, and wherein the refresh rate is specified to be function of a magnitude of a parameter that is measured by the radiotelephone.

38. A method for operating a display of a wireless mobile station capable of bidirectional RF communications, comprising the steps of:

providing the mobile station with a user interface having a keypad and a display screen;

using the user interface to selectively enable or disable the display of an animation; and when the mobile station is in an Idle mode of operation and the display of an animation is enabled, displaying the animation at a specified location on the display screen, when the mobile station exits the Idle mode of operation and the display of an animation is enabled, terminating the displaying of the animation at the specified location on the display screen, the step of displaying including a step of periodically refreshing the displayed animation at a specified refresh rate so as to give a visual appearance of movement, wherein the specified location and the specified refresh rate form a part of an animation data structure stored within the mobile station;

wherein the step of periodically refreshing includes a step of operating a mobile station timer to periodically time-out at a programmed time-out rate, and wherein the programmed time-out rate is equal to N times the periodic refresh rate, where N is an integer equal to or greater than one.

* * * * *